(12) United States Patent
Inai

(10) Patent No.: US 8,589,622 B2
(45) Date of Patent: Nov. 19, 2013

(54) CONTROL APPARATUS, METHOD OF CONTROLLING APPARATUS AND COMPUTER-READABLE RECORDING MEDIUM

(75) Inventor: Yusuke Inai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 656 days.

(21) Appl. No.: 12/795,981

(22) Filed: Jun. 8, 2010

(65) Prior Publication Data

US 2010/0328814 A1 Dec. 30, 2010

(30) Foreign Application Priority Data

Jun. 26, 2009 (JP) ................................ 2009-152203

(51) Int. Cl.
*G06F 12/00* (2006.01)
(52) U.S. Cl.
USPC ........................................... 711/111; 711/112
(58) Field of Classification Search
USPC ................................................. 711/111, 112
See application file for complete search history.

(56) References Cited

U.S. PATENT DOCUMENTS

| | | | |
|---|---|---|---|
| 6,298,439 B1 * | 10/2001 | Beglin | 713/1 |
| 7,069,379 B2 * | 6/2006 | Inagaki | 711/112 |
| 7,343,459 B2 * | 3/2008 | Prahlad et al. | 711/162 |
| 2006/0253731 A1 * | 11/2006 | Petruzzo | 714/6 |
| 2007/0130432 A1 | 6/2007 | Aigo | |
| 2008/0077758 A1 | 3/2008 | Ohmido | |
| 2008/0114932 A1 | 5/2008 | Kobayashi | |

FOREIGN PATENT DOCUMENTS

| | | |
|---|---|---|
| JP | 2003-6016 A | 1/2003 |
| JP | 2007-156911 A | 6/2007 |
| JP | 2008-077519 A | 4/2008 |
| JP | 2008-123444 A | 5/2008 |

OTHER PUBLICATIONS

"Japanese Office Action" mailed by JPO and corresponding to Japanese application No. 2009-152203 on Apr. 26, 2011, with English translation.

* cited by examiner

*Primary Examiner* — Manorama Padmanabhan
*Assistant Examiner* — Mehdi Namazi
(74) *Attorney, Agent, or Firm* — Fujitsu Patent Center

(57) ABSTRACT

A control apparatus connectable to a memory unit for storing data, for controlling a first tape writing unit including a plurality of first tapes and a second tape writing unit including a plurality of second tapes so that the first and second writing units write same data stored in the memory unit to one of the first tapes and one of the second tapes, respectively, has an obtaining unit for obtaining a progress value indicating a progress of writing data into the one of the second tapes upon completely writing the data into one of the first tapes and a controller for controlling the first and the second tape writing units so that the first and the second writing unit change the writing tapes to another of the first tapes and another of second tapes when the progress value being not more than a predetermined value.

13 Claims, 9 Drawing Sheets

| DATA ID | FLAG | ADDRESS |
|---------|------|---------|
| DATA 1  | N    | 0x····  |
| DATA 2  | D    | ···     |
| DATA 3  | H    | ···     |

| DRIVE ID | DRIVE TYPE | DRIVE STATE | MOUNT TAPE ID |
|----------|------------|-------------|---------------|
| DRV00    | LTO3       | NORMAL      | TAPE00        |
| DRV01    | LTO3       | NORMAL      | TAPE05        |
| DRV02    | LTO3       | NORMAL      | NOT EXIST     |
| DRV03    | LTO3       | NORMAL      | NOT EXIST     |

| TAPE ID | TAPE TYPE | TAPE CAPACITY (MB) | EFFECTIVE DATA CAPACITY (MB) | THE NUMBER OF TIMES OF BEING MOUNTED |
|---------|-----------|--------------------|-----------------------------|--------------------------------------|
| TAPE00  | LTO3      | 400308             | 2021                        | 5                                    |
| TAPE05  | ···       | ···                | ···                         | ···                                  |

CONTROL APPARATUS, METHOD OF CONTROLLING APPARATUS AND COMPUTER-READABLE RECORDING MEDIUM

CROSS-REFERENCE TO RELATED APPLICATION

This application is based upon and claims the benefit of priority of the prior Japanese Patent Application No. 2009-152203, filed on Jun. 26, 2009, the entire contents of which are incorporated herein by reference.

FIELD

The present art relates to a data storage control device, a method for controlling data storage and a program for controlling data storage.

BACKGROUND

A virtual tape device is known which imaginarily behaves as a tape library device for a host computer having requested the device to read or write data.

The virtual tape device reads or writes data (logical volume) practically by using a disk array device. As the virtual tape device uses the disk array device which allows quicker data access than a magnetic tape so as to reply to the host, the virtual tape device performs a process at a high speed in comparison with a case where only a tape library device is used.

Then, the virtual tape device performs a process for saving in the tape (migration) the data written in the disk array device in the background without participation of the host. As saving the data, the virtual tape device can perform a saving process for copying the same data into two tapes, which is called a dual-save process.

According to the dual-save process, the same data is saved severally in the two tapes. If the one tape is in failure, the data can be read from the other tape. Thus, certainty of the data can be enhanced.

According to the dual-save process, if both writing processes into the two tapes finish, a writing process into a back end is regarded as having finished, and the same data existing in the disk array device that is used as a cache can be deleted.

In a case where only the writing process into the one tape delays owing to a load on the library device or a failure, even if the writing process into the other tape has finished, the writing process into the back end has not finished yet. Thus, the disk array device has to keep the data.

If such an event frequently occurs, the disk array device is pressed by the data which cannot be deleted, and ends up in a state where new data coming from the host computer cannot be written. Thus, if the data increases in size in the disk array device and a remaining capacity of the disk array device is smaller than a certain capacity, a tape library of a highest data writing speed is chosen. A method is known for moving to a single-save process then, saving the data in a tape of the chosen tape library device and writing the data from the tape into the other tapes, as disclosed in Japanese Laid-open Patent Publication No. 2008-123444, and No. 2008-77519.

SUMMARY

According to an aspect of an embodiment, a control apparatus connectable to a disk unit for storing data sent out from a host, for controlling a first tape writing unit including a plurality of first tapes and a second tape writing unit including a plurality of second tapes so that the first and second writing units write same data stored in the disk unit to one of the first tapes and one of the second tapes, respectively, has an obtaining unit for obtaining a progress value indicating a progress of writing data into the one of the first tapes or one of the second tapes whose writing process being unfinished upon completely writing the data into one of the first tapes or one of the second tapes and a controller for controlling the first and the second tape writing units so that the first and the second writing unit change the writing tapes to another of the first tapes and another of second tapes when the progress value being not more than a predetermined value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 5 illustrates management information;

FIG. 6 illustrates an example of drive information;

FIG. 7 illustrates an example of tape information;

DESCRIPTION OF EMBODIMENTS

Embodiments will be explained in detail with reference to the drawings. A first embodiment gives an outline of a data storage control device first, and a second embodiment is used for a detailed explanation of the data storage control device.

Figure 1:
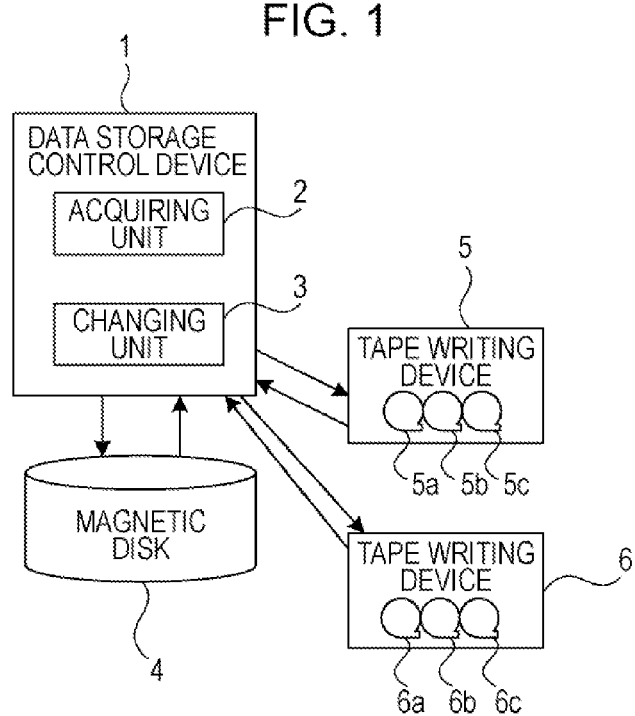
FIG. 1 illustrates a data storage control device of a first embodiment.

FIG. 1 illustrates a data storage control device of a first embodiment. The data storage control device 1 of the embodiment has a function for writing data written in a magnetic disk 4 into one or a plurality of magnetic tapes mounted on a tape writing device 5 and magnetic tapes mounted on a tape writing device 6.

In FIG. 1, magnetic tapes 5a, 5b and 5c are mounted on the tape writing device 5, and magnetic tapes 6a, 6b and 6c are mounted on the tape writing device 6. Further, the data storage control device 1 has a function for reading data from one or a plurality of the magnetic tapes 5a, 5b and 5c, and magnetic tapes 6a, 6b and 6c in response to a request from a host computer which is not shown.

Incidentally, the magnetic tapes 5a, 5b and 5c are mounted on a drive which is not shown and included in the tape writing device 5. The magnetic tapes 6*a*, 6*b* and 6*c* are mounted on a drive which is not shown and included in the tape writing device 6.

The magnetic disk 4 works here as a cache in which, e.g., data sent from the host computer is saved. The data storage control device 1 has an acquiring unit 2 and a changing unit 3.

The acquiring unit 2 manages a state of writing data into the respective magnetic tapes mounted on the tape writing devices 5 and 6. A case where the data storage control device 1 writes data saved in the magnetic disk 4 into the magnetic tapes 5*a* and 6*a* in parallel by means of the dual-save process will be explained below as an example.

If a writing process into the magnetic tape 5*a* finishes, the acquiring unit 2 acquires a process report on a state of writing data into the remaining magnetic tape, i.e., the magnetic tape 6*a*. It is preferable for the process report to include at least one of a progress report on the writing process, a report on mounting a tape on the drive and a schedule of the tape writing device 6.

The changing unit 3 sets the state of writing data into the remaining magnetic tape on the basis of the process report acquired by the acquiring unit 2. For instance, the changing unit 3 can shift to a single-save process and make the tape writing device 6 write the data into the magnetic tape 6*a*. The data storage control device 1 can thereby promptly deal with a change of the state of writing data regardless of the size of the data which cannot be deleted in the magnetic disk 4.

Further, it is preferable for the changing unit 3 to perform a following process. The changing unit 3 first sets a priority of the process for writing data into the magnetic tape 6*a* to be lower than a priority of a process of the magnetic tapes 6*b* and 6*c* mounted on the tape writing device 6.

If the process report includes a progress report on the writing process, the changing unit 3 identifies whether the writing process makes a progress. If the writing process does not make a progress, the changing unit 3 sets the priority of the writing process into the magnetic tape 6*a* to be lower than the priority of the process of the magnetic tapes 6*b* and 6*c* mounted on the tape writing device 6.

If the process report includes a report on mounting tape on the drive, the changing unit 3 identifies whether a tape is mounted on the drive. If no tape is mounted on the drive, the changing unit 3 sets the priority of the process for writing data into the magnetic tape 6*a* to be lower than the priority of the process of the magnetic tapes 6*b* and 6*c* mounted on the tape writing device 6.

Further, if the process report includes a schedule of the tape writing device 6, the changing unit 3 identifies whether the schedule includes processes for the magnetic tapes 6*b* and 6*c*. Then, if the schedule includes processes for the magnetic tapes 6*b* and 6*c*, the changing unit 3 sets the priority of the writing process into the magnetic tape 6*a* to be lower than the priority of the process of the magnetic tapes 6*b* and 6*c* mounted on the tape writing device 6.

Incidentally, an order of the above identifications is not limited in particular. Further, only one of the identifications can be carried out, and a plurality of the identifications can be combined and carried out. The tape writing device 6 prefers and carries out the processes of the magnetic tapes 6*b* and 6*c* rather than the writing process into the magnetic tape 6*a*.

Then, data is written into the magnetic tape 6*a* from the magnetic disk 4, not from the magnetic tape 5*a*. In a case where data is written from the magnetic tape 5*a* to the magnetic tape 6*a*, as the data cannot be continuously written into the magnetic tape 6*a*, it is necessary to once delete the whole data which has been written so far by means of the dual-save process, and to write the data from the beginning.

According to the embodiment, however, even in a case where a delay of the process occurs to the magnetic tape 6*a* or some failure occurs in the magnetic tape 6*a* or the tape writing device 6 during the dual-save process, the process for writing the data from the magnetic disk 4 continues.

The time required for completing the process can thereby be shortened in comparison with a case where the data is written from the beginning. Thus, the data can be quickly deleted from the magnetic disk 4. The access from the host for writing data can thereby be promptly dealt with.

Figure 2:
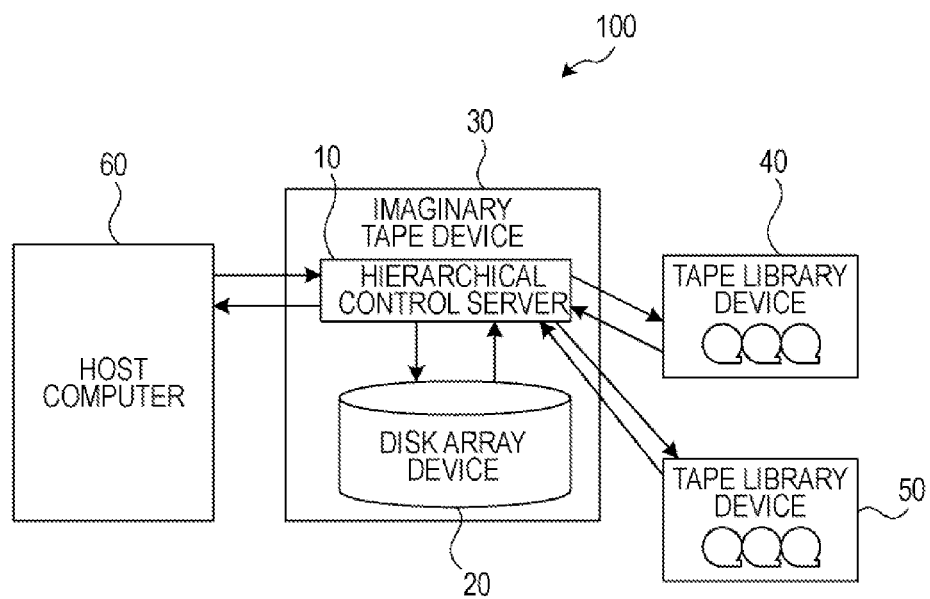
FIG. 2 illustrates a system including a data storage control device of a second embodiment.

FIG. 2 illustrates a system including a data storage control device of a second embodiment. A system 100 includes a host computer 60, an imaginary tape device 30 and tape library devices 40 and 50.

The imaginary tape device 30 has a hierarchical control server (data storage control device) 10 and a disk array device 20. Upon receiving a request from the host computer 60 for reading or writing data, the hierarchical control server 10 apparently behaves to the host computer 60 as a tape library. As a matter of fact, upon receiving a request from the host computer 60 for reading data, the hierarchical control server 10 reads or writes data (logical volume) by using the disk array device 20.

The disk array device 20 is used as a cache for writing data into the tape library devices 40 and 50. It is preferable for the disk array device 20 to have a RAID (Redundant Arrays of Inexpensive Disks) device.

Each of the tape library devices 40 and 50 has a plurality of drives on which magnetic tapes are mounted for writing and reading data. In such a configuration, the imaginary tape device 30 saves data sent from the host computer 60 in a disk provided to the disk array device 20, and then saves the data in the tape library devices 40 and 50 in a multiplex manner.

To put it in more detail, the imaginary tape device 30 carries out a migration process for saving data written into the disk array device 20 asynchronously with the host computer 60 into tapes mounted on the drives provided to the tape library devices 40 and 50.

As to saving data in a tape, a process for saving single data in one tape is called a single-save process, and a process for duplicating single data and saving two data copies in two tapes is called a dual-save process.

In case of performing the dual-save process, same data is saved individually in one of the tapes mounted on the drive provided to the tape library device 40 and in one of the tapes mounted on the drive provided to the tape library device 50.

Thus, if the one tape is in failure, the data can be read from the other tape, and certainty of the data can thereby be enhanced. Further, it is preferable to choose one tape from each of the tape library devices 40 and 50 as the two tapes into which the data is saved for the dual-save process.

Thus, even if the one tape library device is in failure, the data can be assured, and hence certainty of the data can be enhanced. Incidentally, by means of which of the single-save process and the dual-save process the data is written is defined for each unit of the data (logical volume).

After the data is completely saved individually in the tape library devices 40 and 50, then, the imaginary tape device 30 sets the data as data to be deleted from a disk provided to the disk array device 20.

The data set to be deleted will be deleted from the disk later so that an area in which new data written into the disk can be saved is made. The imaginary tape device 30 uses the disk array device 20 which can access data more quickly than the tape library devices 40 and 50 so as to read and write data from and to the host computer 60. The host computer 60 can thereby carry out the process at a higher speed than a speed of directly reading and writing data from and to the tape library devices 40 and 50. A control apparatus connectable to a memory unit for storing data sent out from a host, for controlling a first tape writing unit including a plurality of first tapes and a second tape writing unit including a plurality of second tapes so that the first and second writing units write same data stored in the memory unit into one of the first tapes and one of the second tapes, respectively, comprising, an obtaining unit for obtaining a progress value indicating a progress of writing data into the one of the second tapes upon completely writing the data into one of the first tapes, a controller for controlling the first and the second tape writing units so that the first and the second writing unit change the writing tapes to another of the first tapes and another of second tapes when the progress value being not more than a predetermined value.

Figure 3:
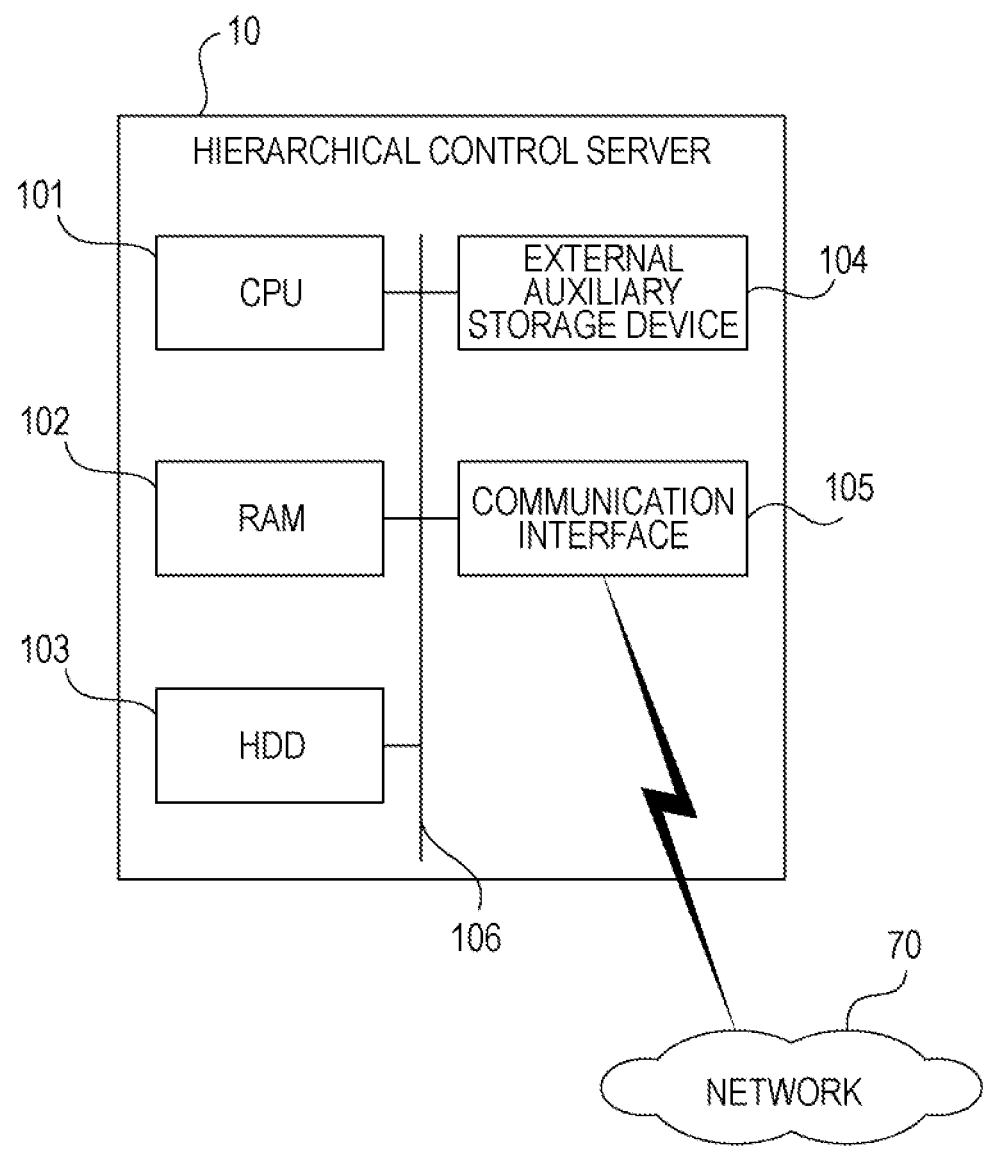
FIG. 3 illustrates an example of a hardware configuration of a hierarchical control server.

FIG. 3 illustrates an example of a hardware configuration of the hierarchical control server. The hierarchical control server 10 includes a CPU (Central Processing Unit) 101 which controls the whole device. The hierarchical control server 10 includes a RAM (Random Access Memory) 102, a hard disk drive (HDD) 103, an external auxiliary storage device 104 and a communication interface 105 which are connected to the CPU 101 through a bus 106.

In the RAM 102, at least portions of a program of an OS (Operating System) and an application program to be run by the CPU 101 is temporarily saved. Further, in the RAM 102, various data required for a process performed by the CPU 101 is saved. The OS and the application program are stored in the HDD 103. Further, a program file is stored in the HDD 103.

The external auxiliary storage device 104 reads and writes data from and to a recording medium. As the recording medium from and to which the external auxiliary storage device 104 can read and write data, e.g., a magnetic recording device, an optical disk, a magneto-optical recording medium, a semiconductor memory, etc. are enumerated. As the magnetic recording device, e.g., an HDD, a flexible disk (FD), a magnetic tape, etc. are enumerated. As the optical disk, e.g., a DVD (Digital Versatile Disc), a DVD-RAM (Random Access Memory), a CD-ROM (Compact Disc Read Only Memory), a CD-R (Recordable)/RW (ReWritable), etc. are enumerated. As the magneto-optical recording medium, e.g., an MO (Magneto-Optical disk), etc. are enumerated.

The communication interface 105 is connected to a network 70. The communication interface 105 sends and receives data to and from the host computer 60 through the network 70.

A processing function of the embodiment can be implemented owing to the above hardware configuration. The hierarchical control server 10 of such a hardware configuration is provided with a function as follows.

Figure 4:
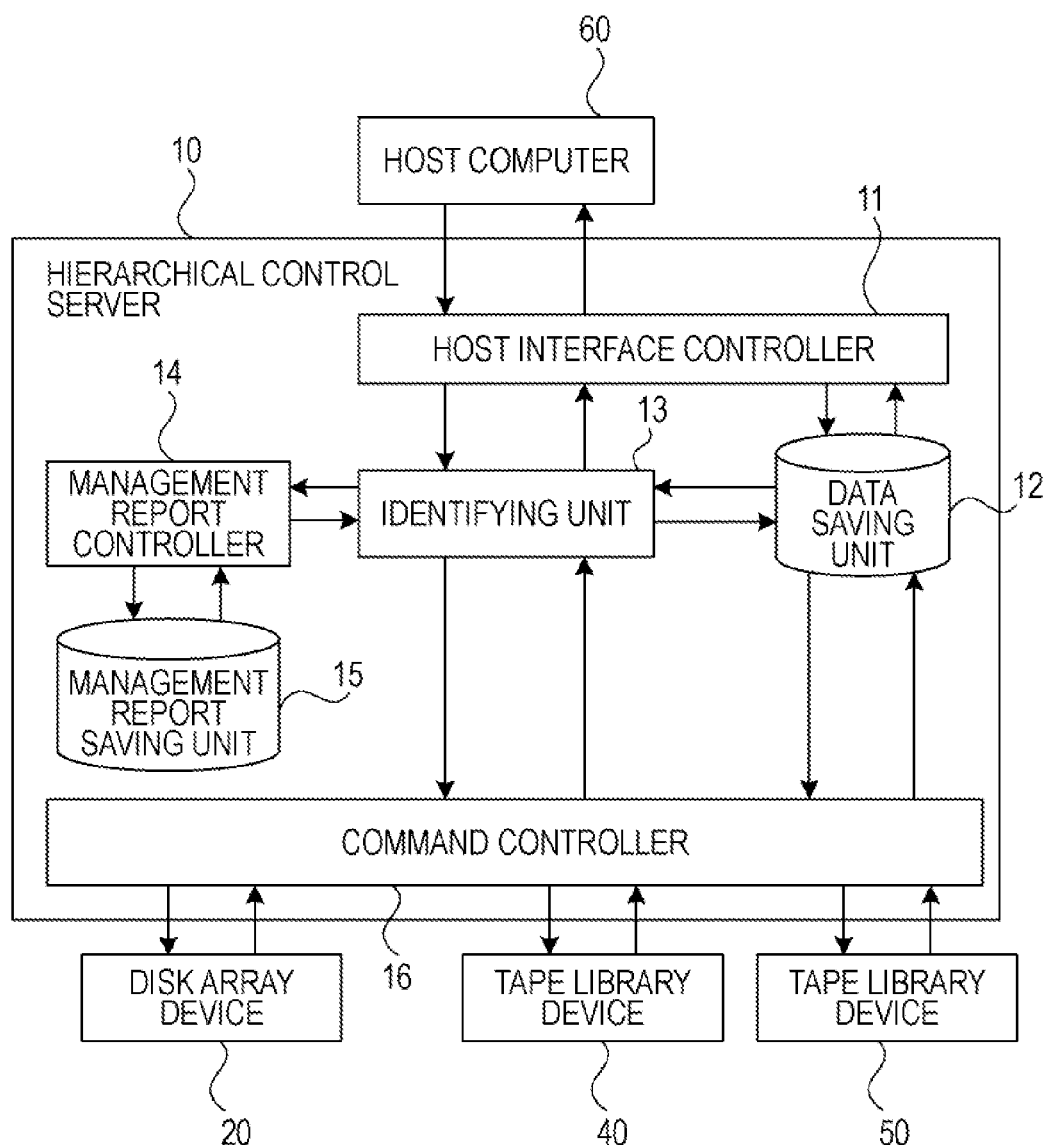
FIG. 4 is a functional block diagram of the hierarchical control server.

FIG. 4 is a block diagram for illustrating the function of the hierarchical control server. The hierarchical control server 10 has a host interface controller 11, a data saving unit 12, an identifying unit 13, a management report controller (identification report changing unit) 14, a management report saving unit 15 and a command controller 16.

The host interface controller 11 receives a request from the host computer 60. In case of a writing request, the host interface controller 11 saves data which has been sent in the data saving unit 12. Further, the host interface controller 11 sends a reply to the request from the host computer 60 to the host computer 60. In case of a reading request, the host interface controller 11 also sends data saved in the data saving unit 12.

Data sent from the host computer 60 is temporarily saved in the data saving unit 12. Further, data read from the disk array device 20 is temporarily saved in the data saving unit 12.

Moreover, the data saving unit 12 manages a history of the data written from the data saving unit 12 to the disk array device 20 and a history of the data read from the disk array device 20 to the data saving unit 12.

A state of use of the disk array device 20 is known with reference to the data. The management report controller 14 controls a report required for writing data into the tape library devices 40 and 50.

To put it specifically, the management report controller 14 updates or reads a report (management report) saved in the management report saving unit 15 for managing a progress of writing data into the tape library devices 40 and 50 as requested by the identifying unit 13.

The management report is saved in the management report saving unit 15. The identifying unit 13 has functions which correspond to the functions of the acquiring unit 2, the changing unit 3 and a disk controller.

To put it specifically, the identifying unit 13 identifies a request that the host interface controller 11 receives from the host computer 60, and performs a following process in accordance with the content of the request. The identifying unit 13 asks the management report controller 14 to change the management report.

Further, the identifying unit 13 asks the command controller 16 to issue commands concerning writing and reading data to and from the disk array device 20 and the tape library devices 40 and 50. Further, as a result of asking the command issuance, the identifying unit 13 performs a process in accordance with a command execution result and the data saved in the data saving unit 12.

Further, the identifying unit 13 asks the host interface controller 11 to reply to the request from the host computer 60. The command controller 16 issues commands to the disk array device 20 and the tape library devices 40 and 50 as requested by the identifying unit 13.

Further, in case of a writing request from the identifying unit 13, the command controller 16 sends the data saved in the data saving unit 12 together with the command issuance. Further, in case of a reading request from the identifying unit 13, the command controller 16 saves data sent as a result of the command issuance in the data saving unit 12.

Then, the management report will be explained. FIG. 5 illustrates the management report. The management report is tabulated and saved in the management report saving unit 15.

A management report management table 15a has columns of a data ID, a flag and an address. Reports in the respective columns arranged in a horizontal line are related to one another. A report which identifies a data ID saved in the disk array device 20 is set in the data ID column.

One of a flag "D" (Dirty), a flag "H" (Half) and a flag "N" (Normal) is set in the flag (Flag) column. The flag "D" is a flag to be used for managing data to be deleted in the disk array device 20.

The flag "H" is a flag to be used for managing a dual-save process given a lower priority (described later). The flag "N" is a flag which indicates that a process for writing the data into a tape has finished.

A data address in the data saving unit 12 is set in the address column. Then, a process of the hierarchical control server 10 will be explained.

<When Requested to Write> The host interface controller 11 receives a request for writing data from the host computer 60. In case of a writing request, data sent from the host computer 60 is saved in the data saving unit 12.

Data sent from the host interface controller 11 is temporarily saved in the data saving unit 12. The identifying unit 13 identifies the request that the host interface controller 11 has received from the host computer 60, and asks the management report controller 14 to change the management report.

The identifying unit 13 asks the command controller 16 to issue a command to the disk array device 20. The command controller 16 issues a command for writing data into the disk array device 20 as requested by the identifying unit 13. At this time, the command controller 16 sends the data saved in the data saving unit 12 together with the command issuance.

Then, the identifying unit 13 asks the command controller 16 to issue a command for performing the dual-save in the tape library devices 40 and 50 asynchronously with the exchange with the host computer 60.

The command controller 16 issues a command for writing data into the tape library device 40 and 50 as requested by the identifying unit 13. At this time, the command controller 16 sends the data saved in the data saving unit 12 together with the command issuance.

The dual-save process is thereby performed. Further, if a writing process into one of the tape library devices finishes during the dual-save process, the identifying unit 13 issues a command to the command controller 16 for acquiring a report (process report) concerning a state of processing of the other of the tape library devices.

Then, the identifying unit 13 identifies on the basis of the process report whether the dual-save process of the other of the tape library devices is given a lower priority. A necessary condition for the identification will be described later. Upon identifying that it is necessary to give a lower priority, the identifying unit 13 issues a command to the command controller 16 for giving a lower priority.

<Reading Data> The host interface controller 11 receives a request for reading data from the host computer 60.

The identifying unit 13 identifies the request that the host interface controller 11 has received from the host computer 60, and asks the management report controller 14 to change the management report. The identifying unit 13 asks the command controller 16 to issue a command to the tape library devices 40 and 50.

The command controller 16 issues a command to the tape library devices 40 and 50 for reading data as requested by the identifying unit 13. Then, the command controller 16 saves data sent as a result of the command issuance in the data saving unit 12.

As a result of asking the command issuance, the identifying unit 13 performs a process in accordance with a command execution result and the data saved in the data saving unit 12. Further, the identifying unit 13 asks the host interface controller 11 to reply to the request from the host computer 60.

The host interface controller 11 sends a reply to the request from the host computer 60 to the host computer 60. In case of a reading request, the host interface controller 11 also sends data saved in the data saving unit 12.

Then, the management report of each of the tape library devices 40 and 50 that the identifying unit 13 receives will be explained. The management report of the tape library device 50 will be explained below as an example.

The management report includes a drive report, a tape report (tape information) and a schedule report. FIG. 6 illustrates an example of the drive report.

The drive report 51 includes reports concerning a drive ID, a drive type, a drive state and a mount tape ID. Reports arranged in a horizontal line are related to one another. As described above, the tape library device 50 has a plurality of drives. Thus, the drive report is set for each of the drives.

For the drive ID, a name which identifies the drive that the tape library device 50 has is set. For the drive type, a standard of a tape that the drive can deal with (that can be mounted on the drive) is set.

For the drive state, a report indicating whether the drive is available is set. As shown in FIG. 6, "normal" is set if the drive is available. For the mount tape ID, a label ID of a tape is set if the tape is mounted on the drive of the tape library device 50. If no tape is mounted on the drive, data of "not exist" is set.

FIG. 7 illustrates an example of the tape report. The tape report 52 includes reports concerning a tape ID, a tape type, a tape capacity, an effective data capacity and the number of times of being mounted. Data arranged in a horizontal line are related to one another.

For the tape ID, a name which identifies the tape is set. For the tape type, a type (standard, etc.) of the tape is set. For the tape capacity, a size of data which can be saved in the tape is set.

Figure 8:
FIG. 8 illustrates an example of schedule information.

For the effective data capacity, a size of data being saved in the data is set. For the number of times of being mounted, how many times the tape is mounted on the drive is set. FIG. 8 illustrates an example of the schedule report.

The schedule report 53 includes a schedule of a reading process for reading data from the tape library device 50, a schedule of a single-save process or a dual-save process performed by the tape library device 50, etc.

To put it specifically, the schedule report 53 includes reports concerning a schedule No., a command type, a priority, a tape in use ID and a schedule time. The schedule No. is allotted to a process in order of being received by the tape library device 50.

For the command type, data distinguishing a write command for writing data and a read command for reading data is set. In case of the write command, an alphabet "W" is set. In case of the read command, an alphabet "R" is set.

For the priority, values of 0-3 are set. A higher priority is given as the value is smaller, and the value of 0 represents the highest priority. The tape library device 50 performs the process in ascending order of the values representing the priority. For the tape in use ID, an ID of a tape being mounted on the drive that the tape library device 50 has is set.

Figure 9:
FIG. 9 illustrates a priority changing command.

For the schedule time, the time when a command is received is set. Then, a priority changing command issued by the identifying unit 13 will be explained. FIG. 9 illustrates the priority changing command.

The priority changing command 13a includes a report specifying the schedule No. and a report indicating a changed priority. A priority to be set is not limited in particular, and can be set to the lowest priority "3" regardless of a present priority value. Further, it can be set to a same priority as that of one of the other tapes having the lowest priority. Further, it can be set to a same priority as that of one of the other tapes having the highest priority.

Upon receiving the priority changing command 13a, the tape library device 50 specifies a schedule included in the schedule report 53 which agrees with the schedule No. included in the priority changing command.

Then, the tape library device 50 rewrites the priority of the schedule included in the schedule report 53 to the priority included in the priority changing command. Then, a process of the system 100 will be explained.

Figure 10:
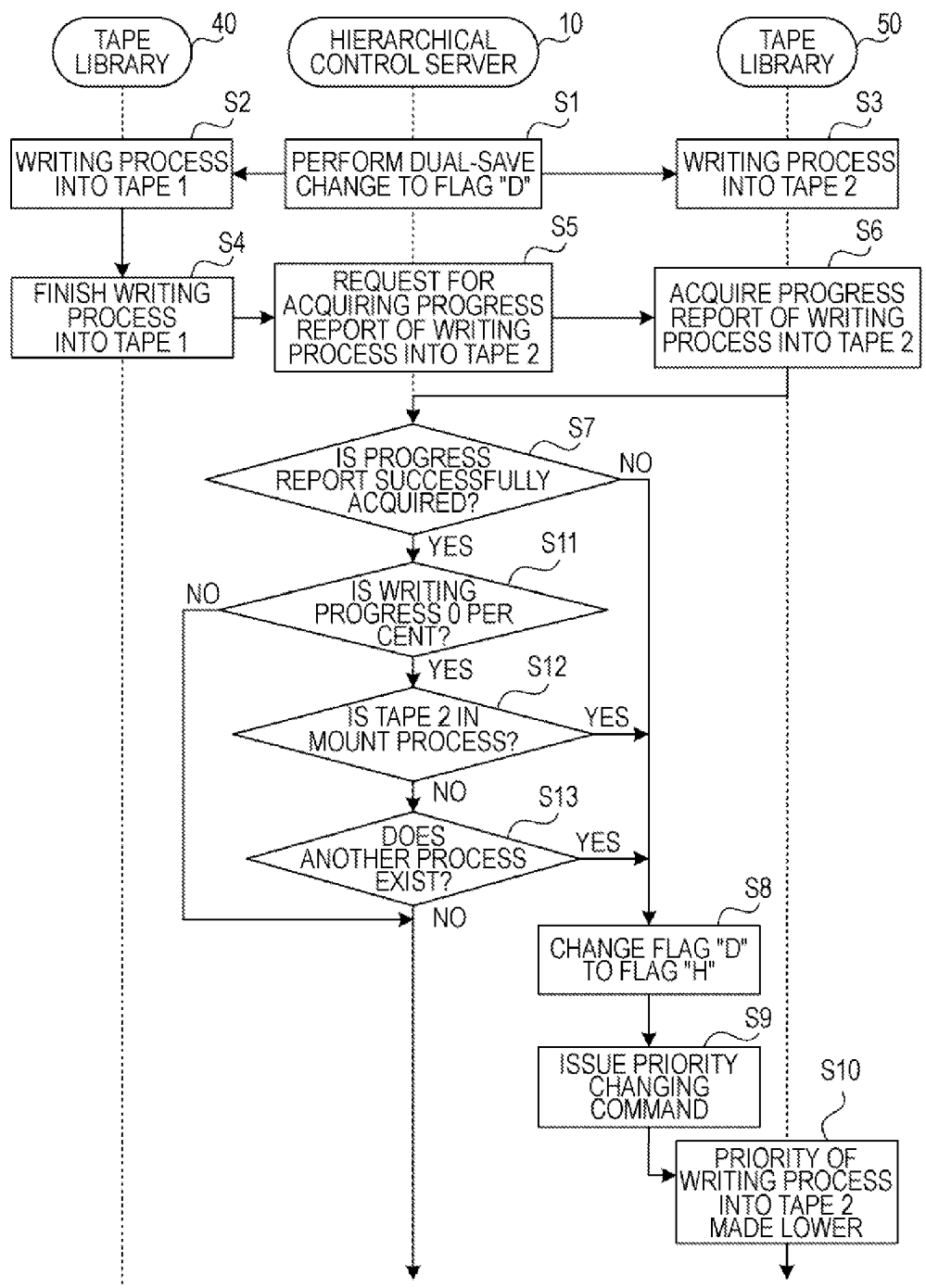
FIG. 10 is a flowchart for explaining a process of the system.
Figure 11:
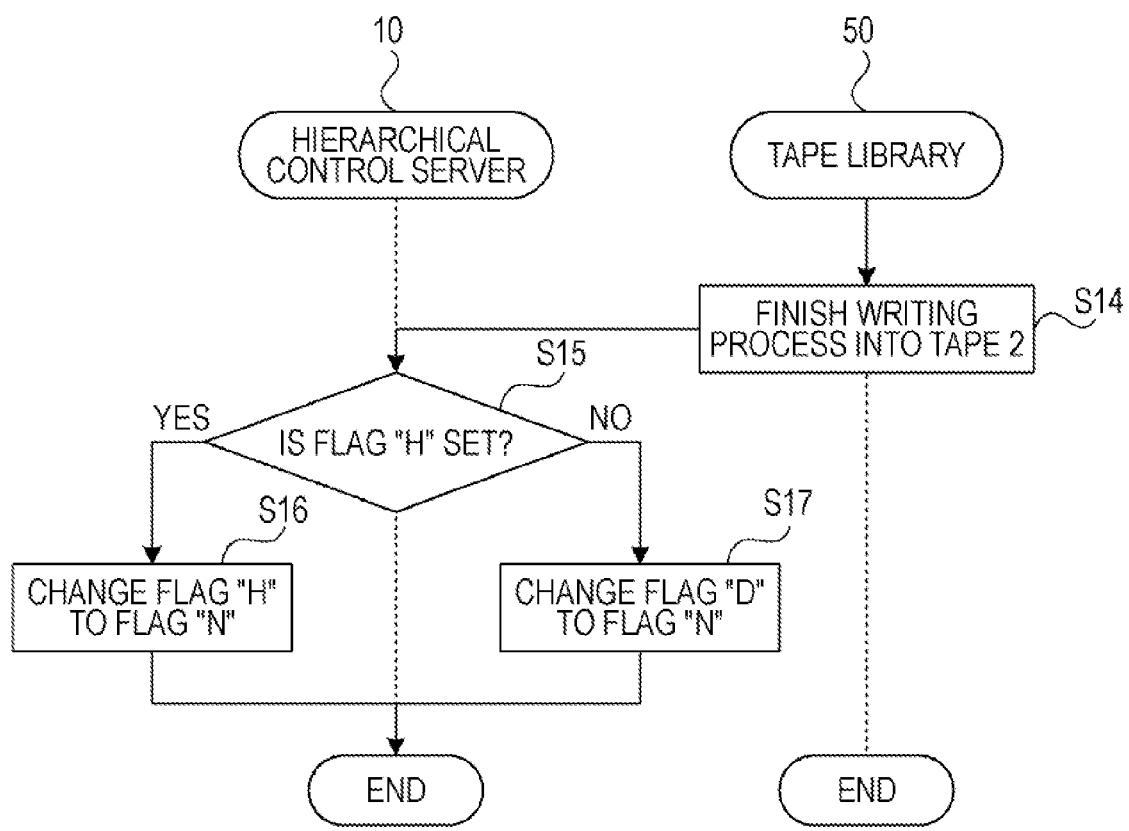
FIG. 11 is a flowchart for explaining the process of the system.

FIGS. 10 and 11 are flowcharts for explaining the process of the system. To begin with, the identifying unit 13 sends a performing request for performing a dual-save process to the command controller 16. Further, the identifying unit 13 sends a management report changing request to the management report controller 14 (step S1).

The management report changing request is a request for changing a flag "N" of the management report included in the management report management table 15a to a flag "D". Upon receiving the management report changing request, the management report controller 14 changes the flag of the management report included in the management report management table 15a.

Upon receiving the performing request, the command controller 16 sends a writing start command to the tape library devices 40 and 50. The tape library device 40 thereby starts a writing process into the tape of the tape ID "tape 1" (merely called "tape 1" hereafter) (step S2).

Further, the tape library device 50 starts a writing process into the tape of the tape ID "tape 2" (merely called "tape 2" hereafter) (step S3). Incidentally, the processes of the steps S2 and S3 are performed in parallel.

Then, upon finishing the writing process, one of the tape library devices (the tape library device 40 in FIG. 8) sends a command execution result of finishing the writing process back to the hierarchical control server 10 (step S4). A case where the tape library device 40 finishes the writing process into the tape 1 first will be explained here as an example.

Upon receiving the command execution result, the command controller 16 sends the command execution result to the identifying unit 13. The identifying unit 13 thereby sends to the command controller 16 an acquiring request for acquiring a progress report of the writing process into the tape 2 (step S5).

Upon receiving the acquiring request, the command controller 16 sends a progress report acquiring command to the tape library device 50. The tape library device 50 thereby acquires the progress report of the writing process into the tape 2 (step S6).

Then, the tape library device 50 sends to the hierarchical control server 10 the acquired writing progress report of the tape 2. Upon receiving the writing progress report, the command controller 16 sends the writing progress report to the identifying unit 13.

Then, after sending the acquiring request to the command controller 16 at the step S5, the identifying unit 13 waits to identify whether the writing progress report is successfully acquired for a certain period of time (step S7). In case of a failure to acquire the report, i.e., if no writing progress report is sent from the command controller 16 before the certain period of time passes (No of the step S7), the identifying unit 13 sends a management report changing request to the management report controller 14 (step S8).

The management report changing request is a request for changing a flag "D" of the management report included in the management report management table 15a to a flag "H". Upon receiving the management report changing request, the management report controller 14 changes the flag of the management report included in the management report management table 15a.

The data to which the flag "H" is set can be deleted from the disk array device 20 even if the flag "H" is not released. As the flag "D" of the management report is changed to the flag "H", the identifying unit 13 performs a process in case of a new reading or writing request received from the host computer 60 as follows.

The identifying unit 13 identifies whether an "unused area" where no data exists in addition to the data to which the flag "H" is set, or data to which the flag "N" is set, exists in the disk array device 20.

If it exists, the identifying unit 13 prefers to use the "unused area" or an area where the data to which the flag "N" is set. That is, the identifying unit 13 prefers to use the "unused area" or the area where the data to which the flag "N" is set for writing the data saved in the data saving unit 12 into the disk array device 20. Then, after making full use of them (if they do not exist), the identifying unit 13 deletes the data to which the flag "H" is set and uses this area.

Although the data is deleted in this case, the value in the column of the flag in the management report management table 15a remains "H". The data to which the flag "H" is set can thereby remain on the disk array device 20 as much as possible.

Then, the identifying unit 13 issues a priority changing command 13a for setting a writing priority of the tape 2 to be lower than priorities of other tapes (step S9). Upon receiving the priority changing command 13a, the command controller 16 sends to the tape library device 50 a priority change report according to the command.

The tape library device 50 sets the priority of the tape 2 included in the schedule report that the tape library device 50 has to be lower than the present priority in accordance with the priority included in the priority change report (step S10).

Meanwhile, if a writing progress report is sent from the command controller 16 before the certain period of time passes (Yes of the step S7), the identifying unit 13 identifies whether the writing progress remains 0 percent (step S11). To put it specifically, the identifying unit 13 makes the identification depending on whether the effective data capacity and the number of times of being mounted of the tape report 52 included in the writing progress report have increased.

If the writing progress does not remain 0 percent, i.e., if the effective data capacity and the number of times of being mounted have increased, the identifying unit 13 continues the dual-save process. Meanwhile, if the writing progress remains 0 percent, i.e., if the effective data capacity and the number of times of being mounted have not increased at all, the identifying unit 13 refers to the mount tape ID included in the writing progress report, and identifies whether the tape 2 is in a mount process (step S12).

If the tape 2 is in the mount process (Yes of step S12), the identifying unit 13 moves forward to the step S8 and performs the process following the step S8. Meanwhile, if the tape 2 is not in the mount process (No of step S12), i.e., if the tape 2 has already been mounted, the identifying unit 13 refers to the schedule time included in the schedule report 53. Then, the identifying unit 13 identifies whether another process exists (step S13).

If another process exists (Yes of step S13), the identifying unit 13 moves forward to the step S8 and performs the process following the step S8. Meanwhile, if no other process exists (No of step S13), the identifying unit 13 continues the dual-save process.

Upon finishing the writing process into the tape 2, then, the tape library device 50 sends a command execution result of finishing the writing process back to the hierarchical control server 10 (step S14 in FIG. 11). The command controller 16 sends the command execution result to the identifying unit 13. Then, the identifying unit 13 sends a management report changing request to the management report controller 14.

The management report controller 14 identifies whether "H" is set to the column of the flag of the management report included in the management report management table 15a (step S15). If a management report for which "H" is set to the column of the flag exists (Yes of step S15), the management report controller 14 changes the flag "H" of the management report to the flag "N" (step S16).

The identifying unit 13 changes the flag "H" to the flag "N" upon the data being allowed to be deleted. The data for which the flag "H" has been released is thereby allowed to be deleted. Meanwhile, if no management report for which "H" is set to the column of the flag exists (No of step S15), the management report controller 14 changes the flag "D" of the management report to the flag "N" (step S17).

Incidentally, although the process indicated by the step S11 is followed by the process indicated by the steps S12 and S13, an order of the process is not limited to the above. For instance, the process indicated by the steps S12 and S13 can be followed by the process indicated by the step S11. Further, the process indicated by the step 13 can be followed by the process indicated by the step S12.

Figure 12:
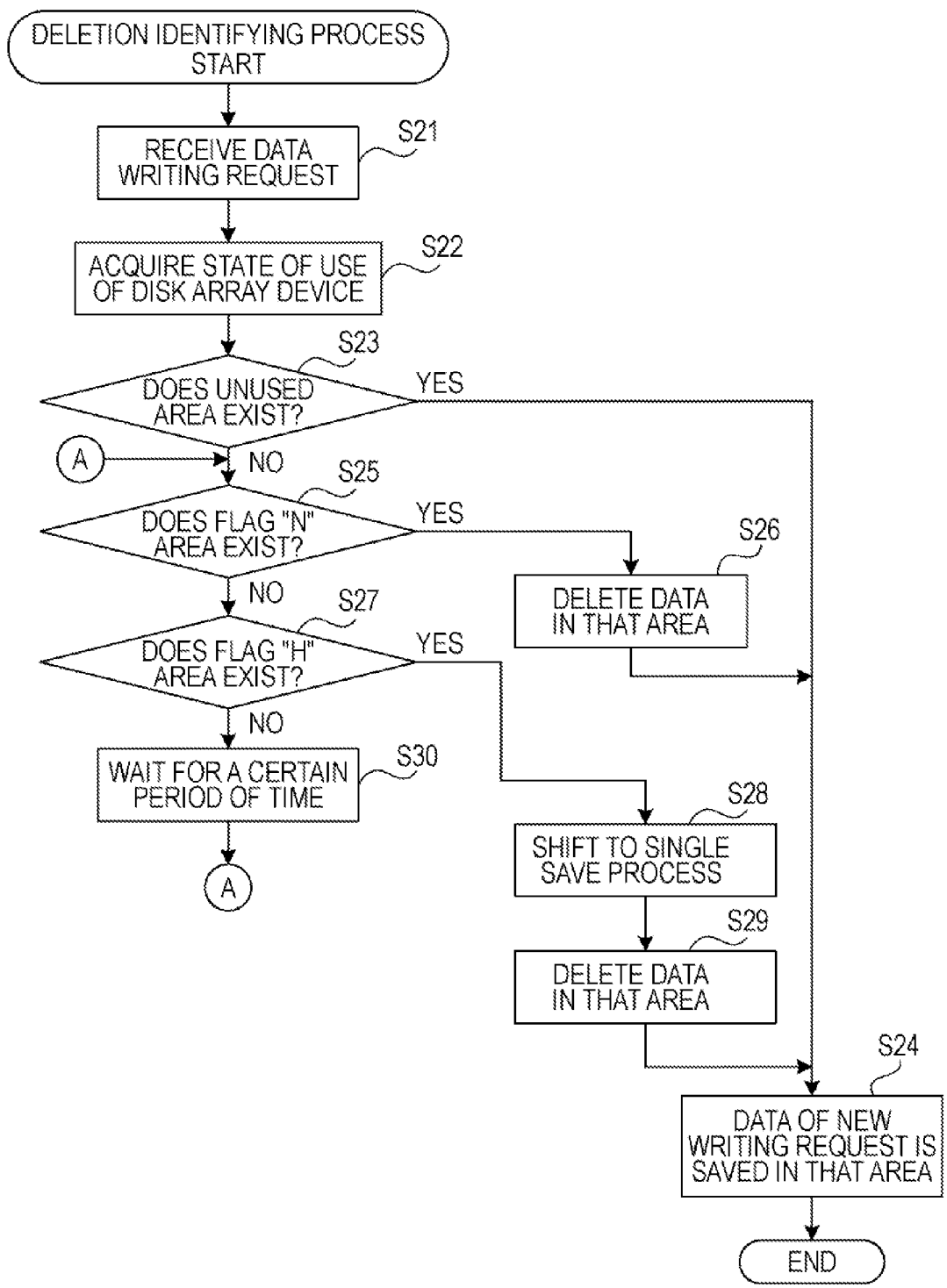
FIG. 12 is a flowchart for illustrating a deletion identifying process.

Then, a process for identifying a deletion of the data to which the flag "H" is set (deletion identifying process) will be explained. FIG. 12 is a flowchart for illustrating the deletion identifying process.

To begin with, the hierarchical control server 10 receives a data writing request (step S21). Then, the identifying unit 13 refers to the data saving unit 12 and acquires a state of use of the disk array device 20 (step S22).

Then, the identifying unit 13 identifies whether an unused area exists in the disk array device 20 on the basis of the acquired state of use of the disk array device 20 (step S23). If an unused area exists (Yes of the step S23), data of the new writing request is saved in that area (step S24).

Then, the identifying unit 13 sends a management report changing request to the management report controller 14 for setting the flag "D" to the data. The management report controller 14 sets the flag "D" to the management report of the data saved at the step S24, and the process finishes.

Meanwhile, if no unused area exists (No of the step S23), the identifying unit 13 identifies whether an area where data to which the flag "N" is set is saved exists (step S25). If an area where data to which the flag "N" is set is saved exists (Yes of step S25), the data in that area is deleted (step S26).

Then, the process moves forward to the step S24, and data in a new writing area is saved in the deleted area (step S24). Then, the identifying unit 13 sends a management report changing request to the management report controller 14 for setting the flag "D" to the data.

The management report controller 14 sets the flag "D" to the management report of the data saved at the step S24, and the process finishes. Meanwhile, if no area where data to which the flag "N" is set is saved exists (No of the step S25), the identifying unit 13 identifies whether an area where data to which the flag "H" is set is saved exists (step S27).

If an area where data to which the flag "H" is set is saved exists (Yes of step S27), a writing process into a tape into which data is being written is forced to end and the process shifts to the single-save process (step S28).

Then, the data in the area where the data to which the flag "H" is set is saved is deleted (step S29). Then, the process moves forward to the step S24, and the data in the new writing area is saved in the deleted area (step S24).

Then, the identifying unit 13 sends a management report changing request to the management report controller 14 for setting the flag "D" to the data. The management report controller 14 sets the flag "D" to the management report of the data saved at the step S24, and the process finishes.

Meanwhile, if no area where data to which the flag "H" is set is saved exists (No of the step S27), the identifying unit 13 waits for an empty area for a certain period of time (step S30). Then the process shifts to the step S25, and the process following the step S25 is continuously performed.

Figure 13:
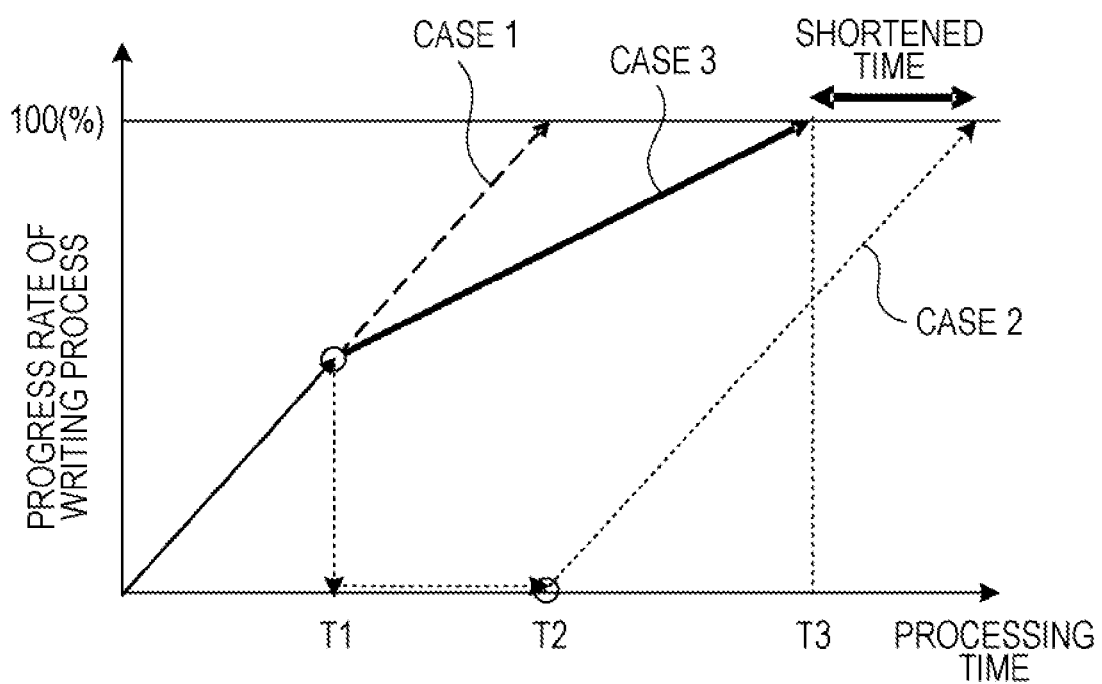
FIG. 13 illustrates time for writing data into a tape library device.

The explanation of the deletion identifying process ends here. Then, time for writing data into the tape library device 50 will be explained. FIG. 13 illustrates the time for writing data into the tape library device.

In FIG. 13, horizontal and vertical axes represent processing time and a progress rate of writing data into the tape library device 50.

<Case 1> A case 1 illustrates a process where the dual-save process is performed to the end.

<Case 2> A case 2 illustrates a process of a system other than the system 100. The system watches a rate of data which cannot be deleted in the data existing in a disk array device that is being used as a cache.

Then, if the rate of the data which cannot be deleted exceeds a threshold that is set in advance (at a time T1) while the dual-save process is being performed, the dual-save process which is presently performed is changed to the single-save process.

At this time, sizes of the data which have finished being written into the respective tapes are compared with each other. Then, the data in the tape (the one tape) of a larger written data size is left as being effective, and the data written in the other tape is made ineffective. FIG. 13 illustrates the progress rate of the other tape.

Then, the single-save process continues. As illustrated in FIG. 13, the progress of the other tape remains 0 percent while the single-save process is being performed (between times T1 and T2). When the process for writing data into the one tape finishes (at the time T2), the process returns from the single-save process to the dual-save process.

At this time, a process for copying data into the other tape is performed on the basis of the data having been written in the one tape (after the time T2).

<Case 3> A case 3 illustrates a process of the system 100.

That is, the case 3 illustrates a process in a case where the system 100 lowers the priority at the time T1 while performing the dual-save process and continues to perform the dual-save process. The progress rate to the processing time decreases owing to the lowered priority.

If the data to which the flag "H" is set remains in the disk array device 20 until the dual-save process having been processed with the lowered priority finishes, the system 100 gives the former priority at that time (a time T3) and performs the dual-save process.

As the data having been written in the tapes are in duplicate, the system 100 can raise the priority and immediately perform the dual-save process. At that time, the identifying unit 13 sends a management report changing request to the management report controller 14 for changing the flag "H" to the flag "N".

The processing time in the case 3 is short in comparison with the processing time in the case 2. The system 100 can promptly perform the process by lowering the priority and continuing the dual-save process as described above.

According to the system 100, as described above, the identifying unit 13 is configured to acquire a processing report indicating a state of writing data into the tape 2 when the writing process into the tape 1 finishes, and to change the state of writing data into the tape 2 on the basis of the acquired processing report.

The system 100 can promptly deal with a change of the state of the writing process regardless of the size of data which cannot be deleted in the disk array device 20. Further, the identifying unit 13 is configured, in a case where the disk array device 20 is loaded much or a delay occurs on the tape library device 40 or 50, to lower the priority and to continue the dual-save process.

The system 100 can thereby promptly finish the writing process and can promptly delete the data from the disk array device 20. The system 100 can thereby promptly deal with the writing request from the host computer 60.

To put it specifically, the identifying unit 13 is configured to lower the priority and to continue the dual-save process under following conditions 1-3.

<Condition 1> (1) No other tape is mounted on the drive of the tape library device.

(2) The progress of the writing process is 0 percent.

(3) Upon the schedule report being checked, other processes of more than the number of the drives mounted on the tape library are scheduled prior to the writing process.

If the conditions (1)-(3) are satisfied, the identifying unit 13 can identify the tape library device as being busy, i.e., the process as being delayed owing to too many scheduled processes for the number of the mounted drives. Thus, the identifying unit 13 issues a command to the command controller 16 for lowering the priority and continuing the dual-save process.

<Condition 2> (1) Another tape is mounted on the drive of the tape library.

(2) The progress of the writing process is 0 percent.

If the conditions (1) and (2) are satisfied, the identifying unit 13 can identify the tape or the drive of the tape library device as being in bad condition (failure). Thus, the identifying unit 13 issues a command to the command controller 16 for lowering the priority and continuing the dual-save process.

<Condition 3> (1) Another tape cannot check the drive report of the tape library device. In this case, the identifying unit 13 can identify the tape library device as being in bad condition. Thus, the identifying unit 13 issues a command to the command controller 16 for lowering the priority and continuing the dual-save process.

Further, the identifying unit 13 is configured to send a management report changing request to the management report controller 14 as the conditions 1-3 are satisfied, and the management report controller 14 is configured to change the "D" flag in the management report management table 15a to the "H" flag.

The data in the disk array device 20 can thereby conditionally be deleted. The single-save process is performed after the data is deleted, and the disk array device 20 can be prevented from being pressed by the data which cannot be deleted. A new data writing request from the host computer 60 can be promptly dealt with.

Further, the identifying unit 13 is configured to prefer to use an area other than the data to which the flag "H" is set for a process for reading or writing data from or to the disk array device 20.

The data to which the flag "H" is set can thereby be left in the magnetic disk as much as possible. Thus, a shift to the single-save process can be prevented and the process can be promptly performed.

Further, the management report controller 14 is configured to change the "H" flag in the management report management table to the "N" flag if the writing process into the tape 2 finishes. The following process can thereby be promptly dealt with.

Although the embodiment has been explained in the case where two tape library devices 40 and 50 are used for saving data, the embodiment can be applied, not limited to the above, to a case where three or more tape library devices are used for saving data.

Further, the embodiment can be applied in case of performing the dual-save process by using a single tape library device.

Further, the embodiment can be applied in case of saving data in a tape library device connected through a LAN or the Internet.

The data storage control device, the method for controlling data storage and the program for controlling data storage of the present art have been explained above on the basis of the embodiment illustrated in the drawings. The present art is not limited to the above, and the configuration of each of the portions can be replaced by any configuration having a similar function. Further, other optional configurations or steps can be added to the present art.

Further, any two or more of the configurations (features) of the embodiments described above can be combined with one another for the present art. Incidentally, the above processing function can be implemented by a computer. In that case, a program in which processing content of the function of the hierarchical control server 10 is written is provided. As the computer runs the program, the above processing function can be implemented on the computer. The program in which the processing content is written can be saved in a recording medium that can be read by the computer. As the recording medium that can be read by the computer, e.g., a magnetic recording device, an optical disk, a magneto-optical recording medium, a semiconductor memory, etc. are enumerated. As the magnetic recording device, e.g., a hard disk device (HDD), a flexible disk (FD), a magnetic tape, etc. are enumerated. As the optical disk, e.g., a DVD (Digital Versatile Disc), a DVD-RAM (Random Access Memory), a CD-ROM (Compact Disc Read Only Memory), a CD-R (Recordable)/RW (ReWritable), etc. are enumerated. As the magneto-optical recording medium, e.g., an MO (Magneto-Optical disk), etc. are enumerated.

In order that the program is distributed, e.g., a portable recording medium such as a DVD or a CD-ROM on which the program is recorded is on the market. Further, the program can be saved in a storage device of a server computer, so that the program is transferred to another computer through a network.

A computer which runs the program for controlling data storage has the program, e.g., recorded on the portable recording medium or transferred from the server computer, saved in an own storage device. Then, the computer reads the program from the own storage device so as to perform a process in accordance with the program. Incidentally, the computer can read the program directly from the portable recording medium so as to perform the process in accordance with the program. Further, every time the program is transferred from the server computer, the computer can perform the process one by one in accordance with the received program.

As mentioned above, the present invention has been specifically described for better understanding of the embodiments thereof and the above description does not limit other aspects of the invention. Therefore, the present invention can be altered and modified in a variety of ways without departing from the gist and scope thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A control apparatus connectable to a memory unit for storing data sent out from a host, for controlling a first tape writing unit including a plurality of first tapes and a second tape writing unit including a plurality of second tapes so that the first and second writing units write same data stored in the memory unit into one of the first tapes and one of the second tapes, respectively, comprising:
an obtaining unit to obtain a progress value indicating a progress of writing data into the one of the second tapes whose writing process is unfinished upon completely writing the data into the one of the first tapes; and
a controller that to control the second tape writing unit to set a writing process priority of the one of the second tapes to be lower than a writing process priority of others of the second tapes and to continue to write the data in the memory unit into the one of the second tapes when the progress value is not more than a predetermined value.

2. The control apparatus of claim 1, wherein the controller controls the second tape writing unit to set the writing process priority and to continue to write the data when the progress value is zero.

3. The control apparatus of claim 1, further comprising an identification information change unit to change identification information identifying data set as undeletable to identification information identifying data set as deletable under a predetermined condition.

4. The control apparatus of claim 3, further comprising a disk control unit to use a region storing data, the data associated with the changed identification information, different to a region storing data, the data not associated with the changed identification information.

5. The control apparatus of claim 3, wherein identification information change unit changes the changed identification information to identification information identifying data set as deletable in case that there is data associated with the changed identification information upon completely writing data into the one of the second tapes.

6. A method of controlling an apparatus having a memory unit for storing data sent out from a host, a first tape writing unit including a plurality of first tapes, a second tape writing unit including a plurality of second tapes, and a controller for controlling the first tape writing unit and the second tape writing unit, the method comprising:
controlling the first tape writing unit and the second tape writing unit so that the first and second writing units write same data stored in the memory unit into one of the first tapes and one of the second tapes, respectively;
obtaining progress information indicating a state of writing data into the one of the second tapes upon completely writing the data into one of the first tapes; and
controlling the second tape writing unit to set a writing process priority of the one of the second tapes to be lower than a writing process priority of others of the second tapes and to continue to write the data in the memory unit into the one of the second tapes based on the progress information.

7. The method of claim 6, wherein the progress information is a progress value indicating a progress of writing data, and the controlling controls the second tape writing unit to set the writing process priority and to continue to write the data when the progress value is zero.

8. The method of claim 6, wherein the progress information is mount information indicating mounting a tape on a drive, and the controlling controls the second tape writing unit to set the writing process priority and to continue to write the data when the second tape undergoing a mounting process.

9. The method of claim 6, wherein the progress information is a schedule of the first and the second tape writing unit, and the controlling controls the second tape writing unit to set the writing process priority and to continue to write the data when another process exists.

10. A non-transitory machine-readable storage medium that stores a computer program for controlling an apparatus connectable to a memory unit for storing data sent out from a host, to a process comprising:
controlling a first tape writing unit including a plurality of first tapes and a second tape writing unit including a plurality of second tapes so that the first and second writing units write same data stored in the memory unit into one of the first tapes and one of the second tapes, respectively;
obtaining progress information indicating a state of writing data into the one of the second tapes upon completely writing the data into the one of the first tapes; and
controlling the second tape writing unit to set a writing process priority of the one of the second tapes to be lower than a writing process priority of others of the second tapes and to continue to write the data in the memory unit into the one of the second tapes based on the progress information.

11. The non-transitory machine-readable storage medium of claim 10, wherein the progress information is a progress value indicating a progress of writing data, and the controlling controls the second tape writing unit to set the writing process priority and to continue to write the data when the progress value is zero.

12. The non-transitory machine-readable storage medium of claim 10, wherein the progress information is mount information indicating mounting a tape on a drive, and the controlling controls the second tape writing unit to set the writing process priority and to continue to write the data when and the second tape is undergoing a mounting process.

13. The non-transitory machine-readable storage medium of claim 10, wherein the progress information is a schedule of the second tape writing unit, and the controlling controls the second tape writing unit to set the writing process priority and to continue to write the data when another process exists.

* * * * *